US010516684B1

United States Patent
Jiang et al.

(10) Patent No.: US 10,516,684 B1
(45) Date of Patent: Dec. 24, 2019

(54) RECOMMENDING AND PRIORITIZING COMPUTER LOG ANOMALIES

(71) Applicant: Instart Logic, Inc., Palo Alto, CA (US)

(72) Inventors: Heju Jiang, Menlo Park, CA (US); Parvez Ahammad, San Jose, CA (US)

(73) Assignee: Instart Logic, Inc., Palo Alto, CA (US)

( * ) Notice: Subject to any disclaimer, the term of this patent is extended or adjusted under 35 U.S.C. 154(b) by 198 days.

(21) Appl. No.: 15/492,965

(22) Filed: Apr. 20, 2017

Related U.S. Application Data (60) Provisional application No. 62/325,928, filed on Apr. 21, 2016.

(51) Int. Cl.
*H04L 29/06* (2006.01)
*G06F 21/55* (2013.01)

(52) U.S. Cl.
CPC ........ *H04L 63/1425* (2013.01); *G06F 21/552* (2013.01)

(58) Field of Classification Search
CPC .......................... H04L 63/1425; G06F 21/552
See application file for complete search history.

(56) References Cited

U.S. PATENT DOCUMENTS

| | | | | |
|---|---|---|---|---|
| 7,523,016 B1 * | 4/2009 | Surdulescu | ........... | G06F 21/316 702/185 |
| 7,792,770 B1 * | 9/2010 | Phoha | .................... | G06N 20/00 706/45 |
| 10,248,533 B1 * | 4/2019 | Shah | .................. | G06F 11/3452 |
| 2006/0242706 A1 * | 10/2006 | Ross | .................. | G06F 21/55 726/23 |
| 2015/0033084 A1 * | 1/2015 | Sasturkar | ........... | G06F 11/0709 714/46 |
| 2016/0147585 A1 * | 5/2016 | Konig | ................ | G06F 11/3419 714/37 |
| 2016/0219067 A1 * | 7/2016 | Han, II | ............... | H04L 63/1425 |
| 2016/0350165 A1 * | 12/2016 | LeMond | ............... | G06F 11/079 |
| 2017/0004188 A1 * | 1/2017 | Gupta | .................... | G06F 16/21 |
| 2017/0091008 A1 * | 3/2017 | Cherbakov | .......... | G06F 11/079 |
| 2017/0277727 A1 * | 9/2017 | Chen | ....................... | G06F 21/56 |
| 2018/0365124 A1 * | 12/2018 | Togawa | .............. | G06F 11/3485 |

OTHER PUBLICATIONS

Geijer, Cecilia et al., "Log-Based Anomaly Detection for System Surveillance", Master's thesis in Computer Systems and Networks Chalmers University of Technology Gothenburg, Sweden 2015, 71 total pages. (Year: 2015).*

* cited by examiner

*Primary Examiner* — Michael Pyzocha
(74) *Attorney, Agent, or Firm* — Van Pelt, Yi & James LLP (57) ABSTRACT

Computer log entries are processed to determine a plurality of baseline rank values associated with a ranking dimension. An overall baseline rank indicator is computed using the determined baseline rank values. For each log data component value combination included in a group of log data component value combinations, a comparison rank value associated with the ranking dimension is determined. Each of the comparison rank values is compared with the overall baseline rank indicator. Based at least in part on the comparisons, one or more log data component value combinations included in the group of log data component value combinations are identified as more anomalous than other log data component value combinations included in the group of log data component value combinations.

20 Claims, 7 Drawing Sheets

Input: Access log $L$, measurement metric $M$, ranking function $F$, the number of values to take from each category $p$ 1 forall $A_j \in L$ do

// Sort all values in $A_j$ by ranking function $F$ based on measurement metric $M$. The resulting rank ordering is $r_j$ 2    $r_j \leftarrow F(A_j, by = M)$     // Take top $p$ values from each category 3    $A_{j,(p)} \leftarrow r_j [: p]$     // Permutation to generate $S_B$, the set of baseline categorical combinations 4 return $S_B \leftarrow \{ A_{1,(p)} \times A_{2,(p)} \times ... \times A_{m,(p)} \}$

Input: Access log $L$, baseline categorical combinations $S_B$, non-baseline categorical combinations $S_{NB}$ 1 initialize $D$, an empty indexable and sortable data structure
  // for example, a Python list 2 forall $c_j \in C$ do
  // Compute baseline MRR for entity $c_j$ 3 $\quad MRR_j \leftarrow \frac{1}{\text{card }(S_B)} \sum_{q=1}^{\text{card }(S_B)} RR_{(q,j)}$
  // $RR_{(q)}$ is indexed by $s_q$ 4 $\quad$ forall $s_{nb} \in S_{NB}$ do
  // append $D$ with the L-1 distance between $RR_{(nb)}$ and $MRR_j$ 5 $\quad\quad D \leftarrow D \frown (d_1 (RR_{(nb)} - MRR_j))$ 6 return $D$

Input: Integer $K$, data structure $D$ with all L-1 distances indexed by entity $c_j$ and non-baseline categorical combinations $s_{nb}$ 1 Initialize $DS$, an indexable data structure to store results
　// For example, a Python dictionary or array 2 forall $c_j \in C$ do

3　　$D_{C_j} \leftarrow sort(D_{C_j}, order = descending)$
　　// Find top $K$ categorical combinations with largest L-1 distances to $MRR_j$ 4　　$s_{(nb,i)} \leftarrow D_{C_j}[:K]$
　　// Append $DS$ with top $K$ categorical combinations, indexed by entity $c_j$ 5　　$DS \leftarrow DS \frown s_{(nb,i)}$ 6 return $DS$

FIG. 5C

RECOMMENDING AND PRIORITIZING COMPUTER LOG ANOMALIES

CROSS REFERENCE TO OTHER APPLICATIONS

This application claims priority to U.S. Provisional Patent Application No. 62/325,928 entitled PRIORITIZING LOG ANOMALY ALERTS AND GENERATING RECOMMENDATIONS filed Apr. 21, 2016 which is incorporated herein by reference for all purposes.

BACKGROUND OF THE INVENTION

Large-scale security policy management (SPM) typically involves human computer security experts working to refine security policies. One of the most challenging tasks for security experts is the identification of threats that may have already evaded intrusion detection systems (IDS) and web application firewalls (WAF). Because activity is tracked in computer logs such as web access logs, threats may be discovered by identifying anomalous patterns in the computer logs. Human computer security experts typically manually sift through logs in an attempt to identify anomalous patterns. However, given the vast amount of log data, identifying anomalous patterns is akin to finding a "needle in the haystack." The end-to-end time-to-discover is long and the largely manual process is exhausting. For example, as web traffic grows, it is becoming increasingly more critical to discover anomalies as fast as possible in the most efficient manner possible. Therefore, there exists a need for a faster and more efficient way to discover anomalies in entries of computer logs to improve security and functioning of a computer system.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Analyzing entries of a computer log is disclosed. An example of the computer log is a web/network access log that includes log entries that identify network requests. Other examples of the computer log include an error log, a utilization log, and a storage log, among others. Entries of the computer log include data components that may be categorized under different categories/fields. For example, each of the data components that make up a computer log entry may be categorized under one of the following data categories/fields: Customer Identifier, Unique ID, Source Entity, HTTP/HTTPS, Device, Device Operating System, Content Type, User Agent, Country, Request Status, Client IP address, Content Length, Request URL, Request Type, Host, Proxy, Date, Hour, UNIX Epoch, etc.

In some embodiments, a recommender system provides to a user (e.g., computer security expert) a listing of detected anomalous patterns (e.g., combination of values of data categories) in one or more computer logs. These patterns may be utilized by the computer security expert to obtain associated computer log entries for further examination and analysis to diagnose and triage computer security threats. By automatically discovering and prioritizing the anomalous patterns, the amounts of effort and time required to discover anomalies recorded in computer logs are reduced. However detection of these anomalous patterns is difficult without a priori information or inference. In the various embodiments described, this gap is filled by bootstrapping baseline data to discover, rank, and recommend anomalies for further analysis.

There exists a double-sided cold-start problem: because users do not have knowledge about unknown anomalies, and entries in the logs do not provide information about unknown anomalies. To address this problem, item-related information may be extracted from the log itself to bootstrap baseline data and relative ranking information may be utilized to establish a measure of normality and prioritize anomalies. In some embodiments, entries of the computer log are analyzed to determine one or more baseline rank values associated with a ranking dimension and an overall baseline rank indicator is computed using the determined baseline rank values. For example, in order to detect anomalous computer log entries, a rank order is determined for the ranking dimension for each subset of log entries matching an associated baseline log data categorical value combination (e.g., baseline combination of log data components). These rank orders may be at least in part averaged across different baseline log data categorical value combinations to compute the overall baseline rank indicator.

In some embodiments, a rank value is determined for each of a plurality of other (e.g., non-baseline) log data categorical value combinations (e.g., non-baseline combinations of log data components) and each of these rank values is compared with the overall baseline rank indicator. For example, eligible non-baseline log data categorical value combinations that do not include baseline log data categorical value combinations are identified, and a rank order is determined for the ranking dimension for each subset of log entries matching an associated non-baseline log data categorical combination. Comparing the non-baseline rank value with the overall baseline rank indicator may include determining a distance value between the non-baseline rank value and the overall baseline rank indicator (e.g., determine a difference between the non-baseline rank value and the overall baseline rank indicator).

Based at least in part on the comparison, one or more candidate log data categorical value combinations are identified as anomalous (e.g., associated with potentially anomalous entries of the computer log). For example, non-baseline log data categorical value combinations associated with rank values that are furthest away from the overall baseline rank indicator are identified as the most anomalous log data categorical value combinations (e.g., associated with potentially anomalous entries of the computer log). A user may utilize a list of these identified anomalous log data categorical value combinations to obtain log entries that match these identified anomalous log data categorical value combinations and analyze these matching log entries to determine whether the matching log entries indicate security threats or other computer system events of interest.

Figure 1:
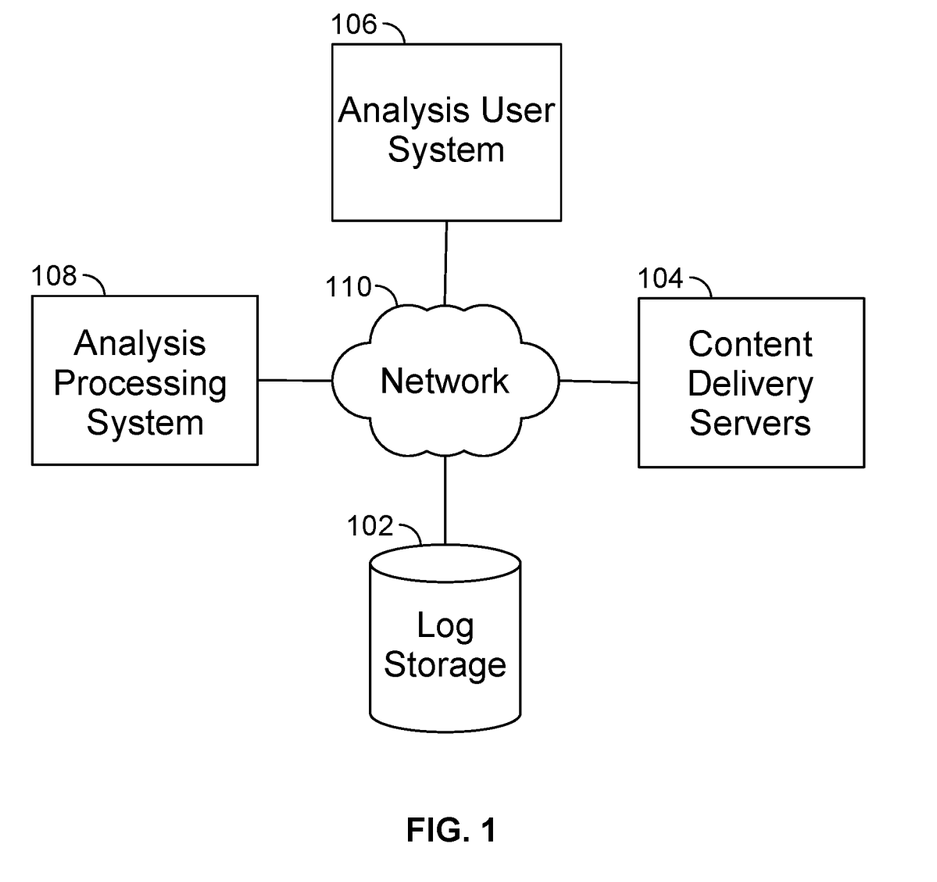
FIG. 1 is a block diagram illustrating an embodiment of a system for analyzing entries of a computer log.

FIG. 1 is a block diagram illustrating an embodiment of a system for analyzing entries of a computer log. Computer log storage 102 stores one or more computer log entries generated by deployed servers 104. For example, computer log storage 102 stores network/web access log entries of content delivery servers 104. In some embodiments, content delivery servers 104 includes servers (e.g., edge servers) of a content delivery network serving content to user systems. Computer log entries generated by content delivery servers 104 may be sent by servers 104 to storage 102 for storage and/or obtained by computer log storage 102. In some embodiments, computer log storage 102 serves as a central repository that gathers together log entries of various different computer logs from different computers/servers. In some embodiments, the various different computer logs are combined together in log storage 102 into a combined computer log. In some embodiments, storage 102 represents a plurality of storage devices (e.g., storage 102 is a distributed storage).

An example of the computer log stored in storage 102 includes a web/network access log that includes log entries that identify network requests. Other examples of the stored entries include entries of an error log, a utilization log, and a storage log, among others. Entries of the computer log include data components that may be categorized under different categories/fields. For example, each of the data components that make up a computer log entry may be categorized under one of the following data categories/fields: Customer Identifier, Unique ID, Source Entity, HTTP/HTTPS, Device, Device Operating System, Content Type, User Agent, Country, Request Status, Client IP address, Content Length, Request URL, Request Type, Host, Proxy, Date, Hour, and UNIX Epoch.

Analysis user system 106 is a user interface system utilized by a user that desires to analyze computer log entries stored in storage 102. For example, analysis user system 106 is utilized by a computer security expert to access and analyze web access log entries to detect any anomalies that may indicate a computer security threat. Rather than just manually searching and/or analyzing the computer log, analysis user system 106 is provided analysis results from analysis processing system 108 that can be utilized by the user of system 106 to increase the speed and efficiency of the analysis by the user of analysis user system 106. For example, analysis processing system 108 provides a list of log entry patterns (e.g., combination of log data components) or portions that have been automatically identified as anomalous. Using these anomalous patterns/portions, the user may obtain matching entries of the log for further analysis. Analysis user system 106 may send instructions and configurations to analysis processing system 108 to configure and/or instruct analysis processing system 108 to perform analysis desired by the user of user system 106. Any number of different user systems may access analysis processing system 108. Analysis processing system 108 analyzes and processes one or more computer logs to identify log patterns/portions of interest.

The components shown in FIG. 1 are connected and communicate with each other via network 110. Examples of network 110 include one or more of the following: a direct or indirect physical communication connection, a mobile communication network, Internet, intranet, Local Area Network, Wide Area Network, Storage Area Network, and any other form of connecting two or more systems, components, or storage devices together. Other communication paths may exist and the example of FIG. 1 has been simplified to illustrate the example clearly. Although a limited number of instances of many of the components shown in FIG. 1 has been shown to simplify the diagram, additional instances of any of the components shown in FIG. 1 may exist.

Figure 2:
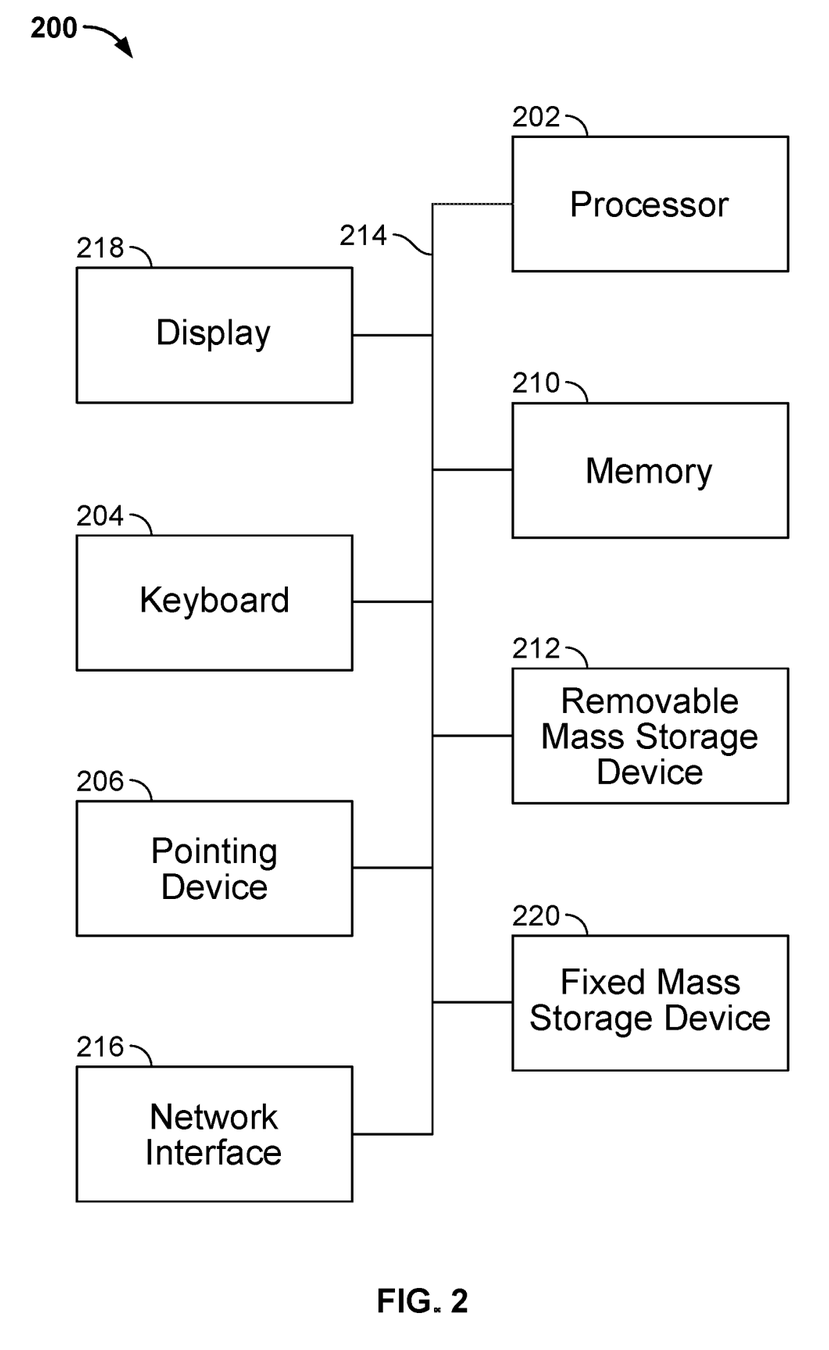
FIG. 2 is a functional diagram illustrating a programmed computer system for handling and/or analyzing computer logs in accordance with some embodiments.

FIG. 2 is a functional diagram illustrating a programmed computer system for handling and/or analyzing computer logs in accordance with some embodiments. As will be apparent, other computer system architectures and configurations can be used to perform analysis on computer logs. In some embodiments, computer system 200 is included in analysis processing system 108 of FIG. 1. Computer system 200, which includes various subsystems as described below, includes at least one microprocessor subsystem (also referred to as a processor or a central processing unit (CPU)) 202. For example, processor 202 can be implemented by a single-chip processor or by multiple processors. In some embodiments, processor 202 is a general purpose digital processor that controls the operation of the computer system 200. Using instructions retrieved from memory 210, the processor 202 controls the reception and manipulation of input data, and the output and display of data on output devices (e.g., display 218). In some embodiments, processor 202 includes and/or is used to provide elements described with respect to FIG. 1 and/or executes/performs the processes described herein.

Processor 202 is coupled bi-directionally with memory 210, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 202. Also as is well known in the art, primary storage typically includes basic operating instructions, program code, data, and objects used by the processor 202 to perform its functions (e.g., programmed instructions). For example, memory 210 can include any suitable computer-readable storage media, described below, depending on whether, for example, data access needs to be bi-directional or uni-directional. For example, processor 202 can also directly and very rapidly retrieve and store frequently needed data in a cache memory (not shown).

A removable mass storage device 212 provides additional data storage capacity for the computer system 200, and is coupled either bi-directionally (read/write) or uni-directionally (read only) to processor 202. For example, storage 212 can also include computer-readable media such as magnetic tape, flash memory, PC-CARDS, portable mass storage devices, holographic storage devices, and other storage devices. A fixed mass storage 220 can also, for example, provide additional data storage capacity. The most common example of mass storage 220 is a hard disk drive. Mass storages 212, 220 generally store additional programming instructions, data, and the like that typically are not in active use by the processor 202. It will be appreciated that the information retained within mass storages 212 and 220 can be incorporated, if needed, in standard fashion as part of memory 210 (e.g., RAM) as virtual memory.

In addition to providing processor 202 access to storage subsystems, bus 214 can also be used to provide access to other subsystems and devices. As shown, these can include a display monitor 218, a network interface 216, a keyboard 204, and a pointing device 206, as well as an auxiliary input/output device interface, a sound card, speakers, and other subsystems as needed. For example, the pointing device 206 can be a mouse, stylus, track ball, or tablet, and is useful for interacting with a graphical user interface.

The network interface 216 allows processor 202 to be coupled to another computer, computer network, or telecommunications network using a network connection as shown. For example, through the network interface 216, the processor 202 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 202 can be used to connect the computer system 200 to an external network and transfer data according to standard protocols. For example, various process embodiments disclosed herein can be executed on processor 202, or can be performed across a network such as the Internet, intranet networks, or local area networks, in conjunction with a remote processor that shares a portion of the processing. Additional mass storage devices (not shown) can also be connected to processor 202 through network interface 216.

An auxiliary I/O device interface (not shown) can be used in conjunction with computer system 200. The auxiliary I/O device interface can include general and customized interfaces that allow the processor 202 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer-readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 2 is but an example of a computer system suitable for use with the various embodiments disclosed herein. Other computer systems suitable for such use can include additional or fewer subsystems. In addition, bus 214 is illustrative of any interconnection scheme serving to link the subsystems. Other computer architectures having different configurations of subsystems can also be utilized.

Figure 3:
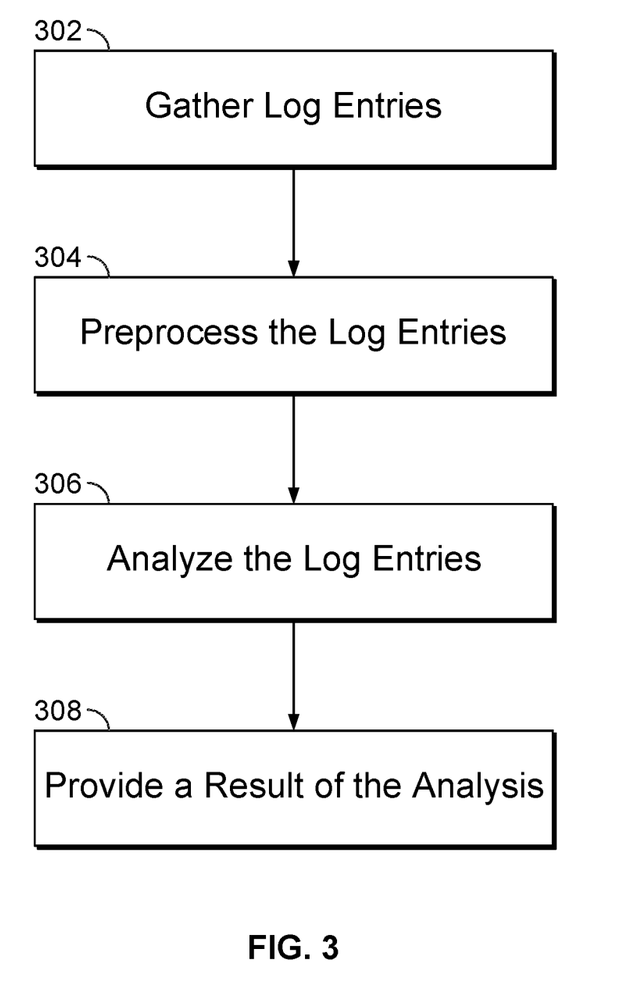
FIG. 3 is a flowchart illustrating an embodiment of a process for analyzing log entries to discover anomalies.

FIG. 3 is a flowchart illustrating an embodiment of a process for analyzing log entries to discover anomalies. The process of FIG. 3 may be at least in part implemented on any of the components shown in FIGS. 1 and 2. For example, at least a portion of the process shown in FIG. 3 is performed by analysis processing system 108 of FIG. 1.

At 302, log entries are gathered. For example, network/web access log entries from servers of a content delivery network are obtained from servers (e.g., from servers 104 of FIG. 1) and stored at a log repository (e.g., stored in storage 102 of FIG. 1). In some embodiments, selecting the log entries includes storing log entries from one or more computer logs into another computer log. For example, log entries from different servers are obtained and stored in a common computer log database. In some embodiments, log entries are modified before being stored in a repository. For example, information (e.g., information identifying source of the log entry, identifier of a content delivery customer, identifier associated with a source log, identifier of a server/computer of a source of the computer log entry, etc.) is added to log entries prior to adding the log entries to a repository. In some embodiments, the log entries have been gathered from a plurality of logs and have been included into a common log database.

An example of a log entry is below. Each data component value of the log entry is categorized under a category/field. For example, for the "Country" category, this log entry includes data component value "United States."

| Customer | Country | Browser | Content_type | Request_type |
|----------|---------------|---------------|--------------|--------------|
| ST | United States | Chrome Mobile | image/jpeg | GET |

At 304, the log entries are preprocessed. Preprocessing allows log entries to be subsequently analyzed faster and more efficiently. For example, prior to performing a specific analysis of the log entries, processing that can be performed to speed up subsequent specific analysis processing is performed. In some embodiments, each data value component of a log entry is categorized under a category/field and all represented unique data values for each category/field represented in log entries are determined. For example, a list of each unique data value for each category/field is generated by iterating through log entries in a log entry repository. Given all possible data components of each data category/field, all possible combinations of data components across all different possible combinations of at least a subset of the categories/fields (e.g., one or more of the combinations of data components may not specify any value for one or more certain data categories) may be determined. In some embodiments, preprocessing the log entries includes performing a numerical count for the number of log entries that match each of these unique combinations of log entry data value components. For example, for the combination "US" (under category "Country") and "image/jpeg" (under category "Content Type"), the total number of log entries that includes data values "US" (under category "Country") and "image/jpeg" (under category "Content Type") is determined.

At 306, the log entries are analyzed. In some embodiments, analyzing the log entries includes selecting a subset of log entries from a larger group of log entries stored in a repository for analysis. For example, log entries matching only a particular time period, customer, user, and/or any other criteria are selected for analysis. In some embodiments, the selection criteria has been preconfigured. In some embodiments, the selection criteria has been at least in part specified by a user (e.g., security expert). In some embodiments, the section criteria is specified in a configuration that can be modified. In some embodiments, analyzing the log entries includes processing the selected log entries to identify patterns/combinations of data values of one or more log data component categories/fields that are anomalous. For example, certain combinations of data values of one or more log data component categories/fields that are detected in the log entries as being anomalous are identified. In some embodiments, analyzing the log entries includes using a result of the processing in 304 to rank numerical counts of the number of log entries matching certain patterns/combinations of data values. In some embodiments, analyzing the log entries includes determining an overall baseline reference rank indicator and using this overall baseline reference rank indicator as a comparison reference for each rank value of patterns/combinations of data values of one or more other log data component categories/fields that can be potentially identified as anomalous.

At 308, a result of the analysis is provided. In some embodiments, the provided result indicates one or more combinations of data values of one or more log data component categories/fields that have been identified as most likely to be anomalous. Each of these combinations may be provided in ranked order based on a determined degree of anomaly (e.g., a value indicating the degree of anomaly is provided). Additionally, visualization (e.g., graphs, charts, etc.) generated based on the result analysis may be provided. In some embodiments, for each identified anomalous categorical value combination, a user (e.g., security expert) is able to obtain actual full log entries matching the data value combination (e.g., matching log entries includes at least the data values of the data component value combination) for further analysis to identify whether the associated log entries indicate security risks (e.g., result of the analysis provides a starting point of further analysis by the user to improve security of a network computer system) or the computer event of interest. For example, by examining the content of the matching log entries as well as location and context of the log entries with respect to other surrounding log entries (e.g., chronologically surrounding log entries, other log entries of same server, IP address, etc.), security experts are able to make a determination as to whether the associated log entries indicate a security threat that needs to be corrected. For example, one or more new computer security policies are implemented based on the result of the analysis.

In some embodiments, in response to the result, additional analysis may be performed based on a newly specified analysis criteria and/or configuration. For example, the process returns to step 306 to perform the analysis using the different analysis criteria and/or configuration.

Figure 4:
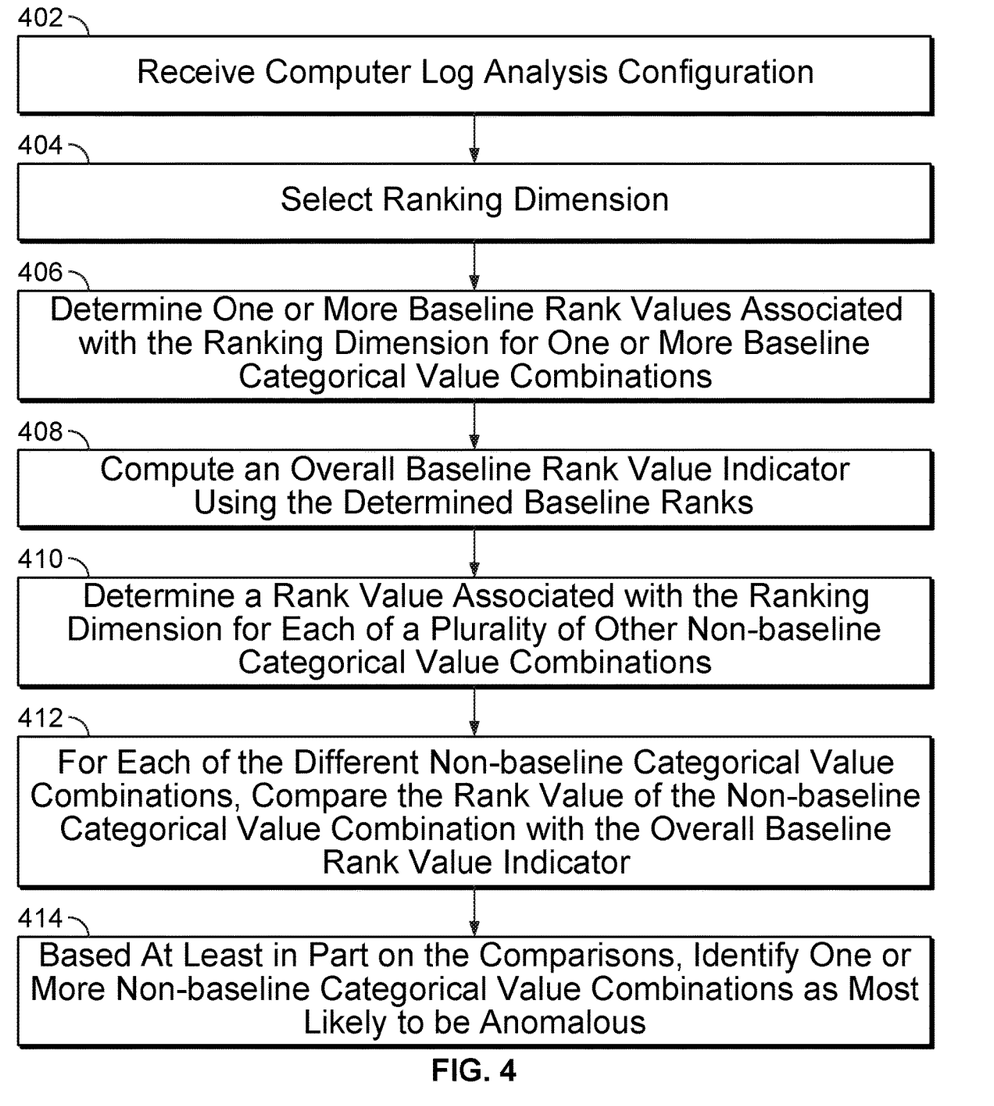
FIG. 4 is a flowchart illustrating an embodiment of a process for analyzing log entries to discover and prioritize anomalies.

FIG. 4 is a flowchart illustrating an embodiment of a process for analyzing log entries to discover and prioritize anomalies. The process of FIG. 4 may be at least in part implemented on any of the components shown in FIGS. 1 and 2. For example, at least a portion of the process shown in FIG. 4 is performed by analysis processing system 108 of FIG. 1. In some embodiments, at least a portion of the process of FIG. 4 is included in 306 of FIG. 3.

At 402, a computer log analysis configuration is received. In some embodiments, receiving the computer log analysis configuration includes receiving from a user a specification of analysis criteria and/or configuration to be utilized in performing the analysis and/or providing a result of the analysis. In some embodiments, at least a portion of the received analysis configuration includes default and/or preset parameters. At least some of these default parameters may be modified by the user. The received configuration parameters include one or more of the analysis configuration parameters as further described herein.

At 404, a ranking dimension is selected. In some embodiments, the ranking dimension is specified in the computer log analysis configuration received in 402. In some embodiments, the ranking dimension identifies a specific log data component category/field and/or a specific value of the specific log data component category/field to be ranked across for different subsets of log entries matching different baseline categorical value combinations. For example, the ranking dimension identifies the basis (e.g., category and/or specific data value) of rank order to be determined across different baseline subgroups of log entries. In some embodiments, the ranking dimension identifies the log data component category that a user would like to rank and/or the ranking dimension identifies the specific value of the log data component category whose most anomalous categorical value combinations are to be identified.

At 406, one or more baseline rank values associated with the ranking dimension for one or more baseline categorical value combinations (e.g., baseline log entry groupings) are determined. In some embodiments, the baseline categorical value combinations are automatically determined based on analysis of the log entries. For example, at least a subset number of log data component baseline categories are selected among all log data component categories, and for each selected data component category, a selected number of top ranked values (e.g., top two) among all unique values for the selected data component category represented in log entries is determined (e.g., using a result of a processing in 304 of FIG. 3). The number of top ranked values per category to be utilized may be the same for every one of the selected log data component baseline categories or the number of top ranked values to be utilized may be different for different ones of the selected log data component baseline categories. The number of top ranked values to be selected per baseline category may be specified in the configuration received in 402 (e.g., specified by a user). In some embodiments, all permutations of combinations of each of these top ranked values of the baseline categories among the combination of all baseline categories are determined. For example, for the permutation of top two values in three categories, $2^3=8$ number of baseline categorical value combinations results. Each of these permutations of baseline categorical value combinations identifies a unique set of baseline categorical values and all log entries matching this set of categorical values (e.g., entries that include the values of the set of baseline categorical values) belong to the baseline log entry grouping of this set of baseline categorical value combinations.

For example, suppose there are m distinct categories $A_1$, $A_2, \ldots, A_m$ in log L including log entries. In an example, let m=3, where $A_1$="Browser", $A_2$="Country", and $A_3$="Content Type". M is the number of entries logged in L, F is sorting numerical values in descending order, and the top 2 values in each category are selected for baseline. Therefore, $r_1$ is the descending rank ordering of all browsers by each browser's number of entries in L and $A_{1,(3)} \leftarrow r_1[:2]$ is the set of the 2 browsers with the largest numbers of entries logged in L. To find the top 2 values in each category: for each of the 2 categories, all entries in the log are aggregated to count the number of entries with every value within each individual category, and each category is sorted and ranked in descending order according to count of entries, resulting in 3 rank orderings: $r_1$, $r_2$, and $r_3$, from which 2 highest ranked values are obtained. An example baseline categorical value combination is: Firefox, Safari (Browser); US, UK(Country); text/html, image/jpeg(Content type).

In another example, suppose length 3 categorical value combinations will be in the form of ordered tuple (e.g., combination of categories [Browser, Country, Content Type]). With 2 values for permutation in 3 categories, there can be $2^3=8$ categorical combinations: (Firefox, US, text/html), (Firefox, US,image/jpeg), (Firefox, UK, text/html), (Firefox, UK, image/jpeg), (Safari, US, text/html), (Safari, US, image/jpeg), (Safari, UK, text/html), and (Safari, UK,image/jpeg). These example 8 tuples form $S_B$, baseline categorical value combinations discovered from L.

Figure 5A:
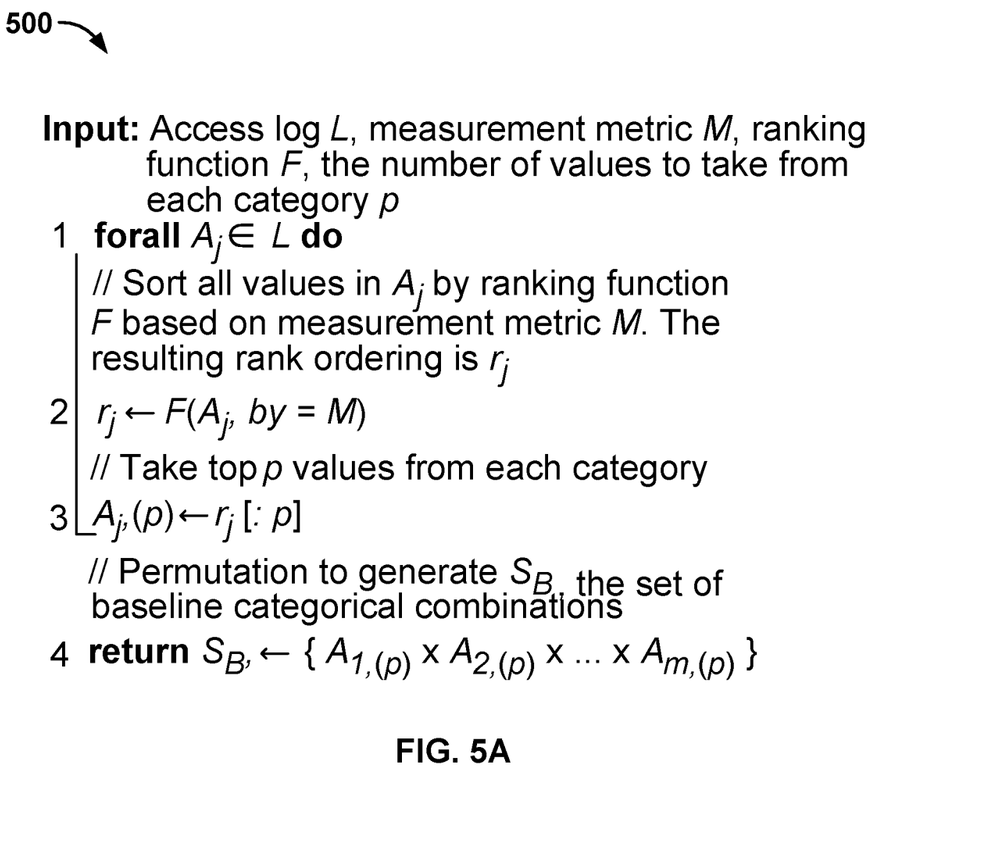
FIG. 5A shows an embodiment of pseudo code 500 for determining baseline categorical value combinations.

In some embodiments, represented as a formal representation, let $n_j=card(A_j)$, $\forall 1 \leq j \leq m$ indicate cardinality of $A_j$, which is the number of distinct categorical values within the category $A_j$. There could be $\Pi_{j=1}^m n_j$ unique categorical combinations, because permutation $S_{all}=\{A_1 \times A_2 \ldots \times A_m\}$ that generates all categorical combinations is a Cartesian product of all $A_j$. FIG. 5A shows an embodiment of pseudo code 500 for determining baseline categorical value combinations.

In some embodiments, a user specifies the one or more baseline log entry groupings (e.g., in a "Hot-start" scenario) rather than automatically determining/generating the baseline log entry groupings. For example, the user specifies the baseline categorical value combinations to be utilized in determining associated baseline rank values. In some embodiments, the user supplies at least one, but preferably more than two baseline categorical value combinations that the user deems as most anomalous (e.g., "given most anomalous categorical value combinations"). In one example, the user supplies two given most anomalous categorical value combinations as the baseline categorical value combinations (for category combinations "Browser", "Country", "Content type", and "Request type") specified as the following: ('Chrome Mobile', 'Kenya', 'text/html', 'POST') and ('Mobile Safari', 'Azerbaijan', 'text/plain', 'GET').

In one example in an average sized security log database, within an hour, for six commonly-seen categories in our security log, there are:

| Name of Category | Number of Unique Items |
|---|---|
| Customers | 100+ |
| Countries | 200+ |
| Browsers/User-Agents | 350+ |
| Request types | 40-50 |
| Content types | 100+ |
| IP addresses | 2.5 million+ |

If the "Customers" category is selected the ranking dimension of, and the categorical combinations of "Countries", "Browsers/User-Agents", "Request types", and "Content types" are to be selected for analysis, there will be roughly: 200*350*50*100=350 million categorical value combinations to be searched through and ranked. Clearly, this number of combinations is impossible for manual human review and requires a computer such as system 108 of FIG. 1 to process.

In some embodiments, the group of baseline categorical value combinations includes an open categorical value combination that matches all log entries. For example, for permutation of top 2 values in three categories, $2^3+1=9$ number of baseline categorical value combinations results. This open categorical value combination allows the ranking dimension to be ranked across all log entries rather than for only a specific limited categorical value combination.

In some embodiments, the baseline rank value is based on a ranking metric that may be specified by a user (e.g., specified in configuration of 402 as "number of log entries ranked in descending order") and/or a default ranking metric may be utilized. In some embodiments, the ranking metric is based on the number count of total number of matching log entries. For example, a baseline rank value of a baseline categorical value combination is determined by determining a count number of log entries for each unique value of the category of the ranking dimension in the subset of log entries matching the baseline categorical value combination and sorting the count numbers to rank each unique value of the category of the ranking dimension by its count number. The baseline rank value for the baseline categorical value combination is then set as the rank number corresponding to a chosen specific value (e.g., selected in 404, selected by a user, etc.) among the unique values of the category of the ranking dimension. In some embodiments, the baseline rank value is a reciprocal rank value (e.g., inverse value of standard rank value).

In one example, "Customers" category is the ranking dimension and the table below shows the number count of total number of matching log entries matching various values of the ranking dimension category for a specific categorical value combination. The table also lists the associate rank value of each of the ranking dimension categories. If the ranking dimension value is the "WQ" value, the baseline rank value is determined as "2" or "0.5" (reciprocal rank of ½=0.5).

| Customer | Categorical Value Combination | Count | Rank |
|---|---|---|---|
| ST | ('Mobile Safari', 'United Kingdom', 'application/json', 'GET') | 3561 | 1 |
| WQ | ('Mobile Safari', 'United Kingdom', 'application/json', 'GET') | 53 | 2 |
| SD | ('Mobile Safari', 'United Kingdom', 'application/json', 'GET') | 22 | 3 |
| ... | ... | ... | ... |

If the count value for a particular categorical value combination and ranking dimension value is zero (i.e., no matching log entries), the rank for that categorical value combination is marked as "none" and not utilized in 408.

At 408, an overall baseline rank value indicator is computed using the determined baseline ranks. In some embodiments, the baseline rank values are reciprocal rank values (e.g., 1/rank value), and the determining of the overall baseline rank value indicator includes determining a mean rank or a mean reciprocal rank.

Mean reciprocal rank value is a mean value of the reciprocals of rank positions across different rank orderings. For example, mean reciprocal rank value (MMR) of entity c across n rank orderings is defined as $$MRR_c \leftarrow \frac{1}{|n|} \sum_{j=1}^{|n|} RR_{(c,j)}$$

where $RR_{(c,j)}$ is the reciprocal of c's rank position in a rank ordering j, where all existing entities in j are sorted by a ranking function F based on measurement metric M. In some embodiments, mean baseline rank value is a harmonic mean value. By using reciprocal rank value and mean reciprocal rank value, rank values are standardized to only range between ranges 0 and 1, allowing easier measurement, comparison, and ranking across categorical value combinations.

In one example, determined baseline rank values in 406 are {38, 22, 45, None, None, None, None, None, None, None, 37, 26} and the mean reciprocal rank value for these baseline rank values is calculated as:

$$\frac{1}{5} * \left( \frac{1}{38} + \frac{1}{22} + \frac{1}{45} + \frac{1}{37} + \frac{1}{26} \right) = 0.032.$$

As shown in this example, rank of "none" (e.g., associated with no matching log entries) is ignored in the calculation.

The mean reciprocal rank value, as mean of multiple reciprocal rank values, measures the magnitude of difference between one group of ranks and another group of ranks for the same ranking dimension. By comparing one ranking dimension's mean reciprocal rank value computed from the group of baseline ranks, and the same ranking dimension's reciprocal ranks in individual non-baseline ranks, a measurement of how far each rank in an individual rank ordering (measured by reciprocal rank value) is from the expected mean rank (measured by mean reciprocal rank value) is determined. Because each rank ordering is indexed by a categorical value combination, the magnitude of differences is a measurement for how far individual categorical combinations are from baseline ones.

In some embodiments, the overall baseline rank value indicator is a weighted average of the determined individual baseline rank values (e.g., weighted mean reciprocal rank). For example, ranks for certain categorical value combinations may be associated with higher weight values than other ranks for other categorical value combinations to increase the influence of these certain categorical value combinations in determining the overall baseline rank value indicator.

In some embodiments, determining the overall baseline rank value indicator includes using a rank value associated with an open categorical value combination (e.g., this rank value indicates rank value of rank dimension across all log entries rather than for only a specific limited categorical value combination) as one of the rank values to average.

At 410, a rank value associated with the ranking dimension is determined for each of a plurality of other non-baseline categorical value combinations. In some embodiments, the non-baseline categorical value combinations include all permutations of combinations of each of unique value (in contrast to only the top value utilized in determining the baseline categorical value combinations) of the log data component categories (e.g., categories utilized for the baseline categorical value combinations), excluding the combinations included in the baseline categorical value combinations.

For example, if a categorical combination does not belong to baseline categorical value combinations $S_B$, it is a non-baseline categorical value combination. Continuing the example discussed previously in determining the baseline categorical value combinations, any categorical combination that is not one of the 8 tuples specified in the example is considered non-baseline: if an ordered tuple of length 3 has the form (Browser, Country, Content Type), and the browser is not Firefox or Safari, or the country is not US or UK, or any content type is not image/jpeg or text/html, the tuple is one of non-baseline categorical value combinations. For example, (Firefox, UK, text/plain) is a non-baseline categorical combination. More formally, $S_B$ is the set of baseline categorical combinations discovered from log L, and $S_{all}=\{A_1 \times A_2 \ldots \times A_m\}$ is all unique categorical value combinations in the form of length m ordered tuples. $S_{NB}$, the set of non-baseline categorical value combinations, is $S_{NB} \leftarrow \{A_1 \times A_2 \ldots \times A_m\} \backslash S_B$, which is any categorical combination that is not in $S_B$.

The rank value for each of a plurality of other non-baseline categorical value combinations is based on the same ranking metric utilized to determine the baseline rank values. For example, the rank value of a non-baseline categorical value combination is determined by determining a count number of log entries for each unique value of the category of the ranking dimension in the subset of log entries matching the non-baseline categorical value combination and sorting the counter numbers to rank each unique value of the category of the ranking dimension by its count number. The non-baseline rank value for this baseline categorical value combination is then set as the rank number corresponding to a chosen specific ranking dimension value (e.g., selected in 404, selected by a user, etc.) among the unique values of the category of the ranking dimension. In some embodiments, the non-baseline rank value is a reciprocal rank value (e.g., inverse value of standard rank value).

In some embodiments, the rank value associated with the ranking dimension for each of the plurality of other non-baseline categorical value combinations in 410 are determined using a different set of log entries than a set of log entries (e.g., entries associated with a different time period) utilized to determine in 406 one or more baseline categorical value combinations and/or the one or more baseline rank values associated with the ranking dimension for the one or more baseline categorical value combinations. For example, if in a computer log with timestamped entries, a recent day is known as a normal day with largely benign patterns, baseline categorical value combinations and/or associated one or more baseline rank values can be determined from log entries of that specific day, and applied to log entries of another more recent day to the rank value associated with the ranking dimension for each of the plurality of other non-baseline categorical value combinations.

At 412, each rank value for each of the different non-baseline categorical value combinations is compared with the overall baseline rank value indicator. For example, a difference in value between the rank value and the overall baseline rank value indicator is determined. For example, an absolute value of difference between the non-baseline rank value and the overall baseline rank value indicator (e.g., L−1 distance) is determined for each non-baseline rank value with respect to the determined mean baseline rank value.

Figure 5B:
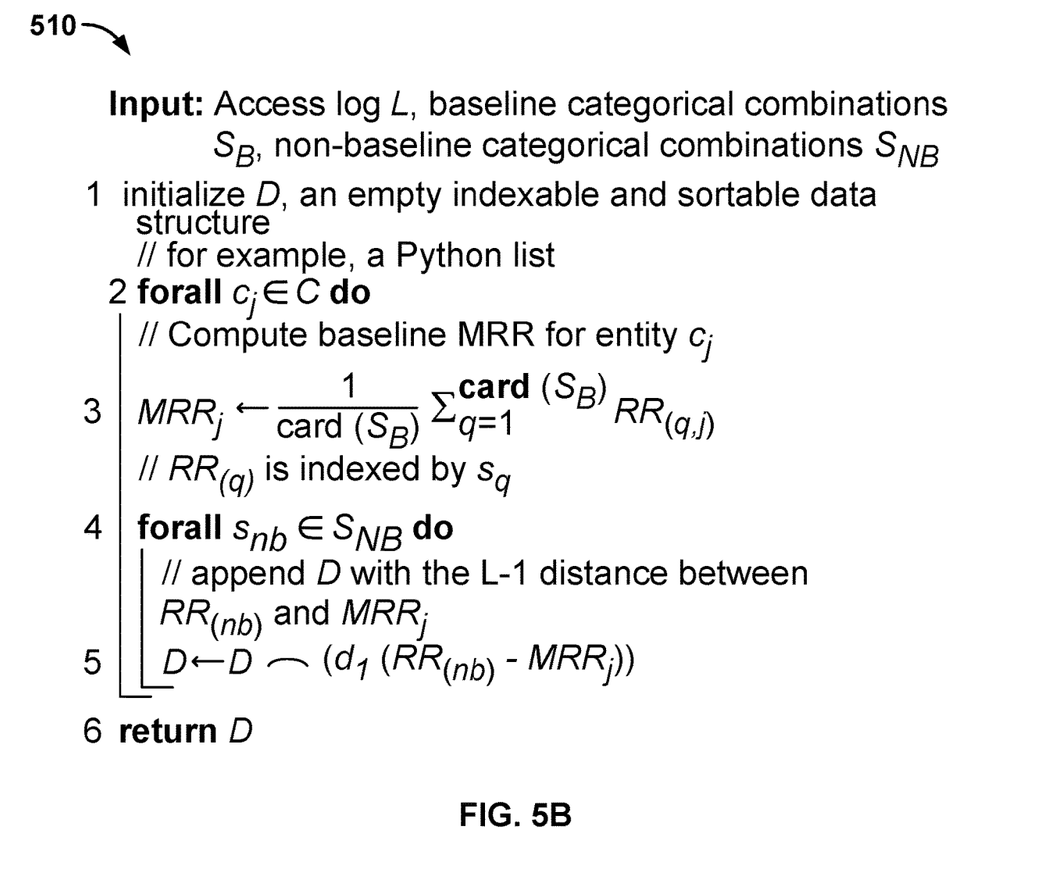
FIG. 5B shows an embodiment of pseudo code 510 for computing a measure of comparison between rank values of baseline categorical value combinations and a mean baseline rank value.

FIG. 5B shows an embodiment of pseudo code 510 for computing a measure of comparison between rank values of baseline categorical value combinations and a mean baseline rank value. Pseudo code 510 shows a more generalized formal representation: $\exists C = \{c_1, c_2, \ldots, c_n\}$, a class of entities in log L, and for some of L's subsets $L_{(i)} = \{L | (A_1, A_2, \ldots, A_m) = s_i\} \neq \emptyset$, where $s_i$ is a length m categorical value combination and $s_i \in S_{all}$, and $C_{(i)}$, a subset of C, is in $L_{(s,i)}$. By measurement metric M and ranking function F, within $L_{(i)}$, $C_{(i)}$ can form a rank order of its members: $R_{(i)} \leftarrow F(C_i; by=M)$. Hence, it follows that RR of all $C_{(i)}$'s members is $RR_{(i)} \leftarrow 1/R_{(i)}$, where $c_j$'s RR is $RR_{(i,j)}$. It then follows that if $s_i \in S_B$, for any $c_j \in C$, the MRR of $c_j$ is $$MRR_j \leftarrow \frac{1}{\text{card}(S_B)} \sum_{q=1}^{\text{card}(S_B)} RR_{(q,j)}.$$

Returning to FIG. 4, at 414, based at least in part on the comparisons, one or more non-baseline categorical value combinations are identified as most likely to be anomalous (e.g., identified more likely or at least as likely to be anomalous than other non-baseline categorical value combinations). For example, non-baseline categorical value combinations associated with the largest rank value differences determined in 412 (e.g., associated with top 5 largest value differences from mean baseline rank value) are identified. The number of non-baseline categorical value combinations to be identified as most likely to be anomalous may be preconfigured and/or specified by a user (e.g., in configuration received in 402). If the identified number of non-baseline categorical value combinations is less than the number of non-baseline categorical value combinations to be identified (e.g., due to insufficient number of log entries with different baseline categorical value combinations along with the ranking dimension value), an error message may be provided.

An example of the identified list of one or more non-baseline categorical value combinations (for category combinations "Browser", "Country", "Content type", and "Request type") is provided as follows:
('Maxthon', 'Germany', 'text/css', 'GET');
('Safari', 'UNKNOWN', 'text/html', 'GET');
('IE Mobile', 'Albania', 'text/css', 'GET');
('Mobile Safari', 'Singapore', 'text/plain', 'POST');
('Chrome Mobile', 'Spain', 'text/html', 'POST').

In some embodiments, the rank value difference of a rank value of a non-baseline categorical value combination from the mean baseline rank value must be at least a threshold value to be eligible to be identified as anomalous. In some embodiments, the non-baseline categorical value combinations identified as most anomalous are provided to a user in 308 of FIG. 3. For example, the non-baseline categorical value combinations identified as most anomalous are utilized to obtain log entries matching the identified baseline categorical value combinations for further analysis to identify potential computer security threats.

In some embodiments, when recommending most anomalous non-baseline categorical value combinations for each value $c_i$ in ranking dimension C, a couple of assumptions may be made. For arbitrary $c_i$ belonging to C, MRR computed from baseline categorical value combinations $S_B$ are considered normal for $c_i$, and $MRR_i$ would be largely preserved across categorical value combinations considered normal for $c_i$. Additionally for non-baseline categorical value combinations $s_{nb,j}$, $s_{nb,q} \in S_{N\_B}$, $s_{nb,j} \neq s_{nb,q}$, a ranking dimension value $c_i$, if L−1 distances: $d_1(RR_{i,s_{nb,j}} - MRR_i) > d_1(RR_{i,s_{nb,q}} - MRR_i)$, then for $c_i$, categorical value combination $s_{nb,j}$ is more anomalous than categorical value combination $s_{nb,q}$. Similarly, if for another $s_{nb,t} \in S_{NB}$, if L−1 distances: $d_1(RR_{i,s_{nb,j}} - RR_{i,s_{nb,t}}) < d_1(RR_{i,s_{nb,t}} - RR_{i,s_{nb,q}})$, then for $c_i$, categorical value combination $s_{nb,j}$ is more similar to categorical value combination $s_{nb,t}$. For a value $c_i$ in ranking dimension C, those non-baseline categorical value combinations producing the largest L−1 distances between baseline categorical combinations are regarded as most anomalous categorical combinations.

Figure 5C:
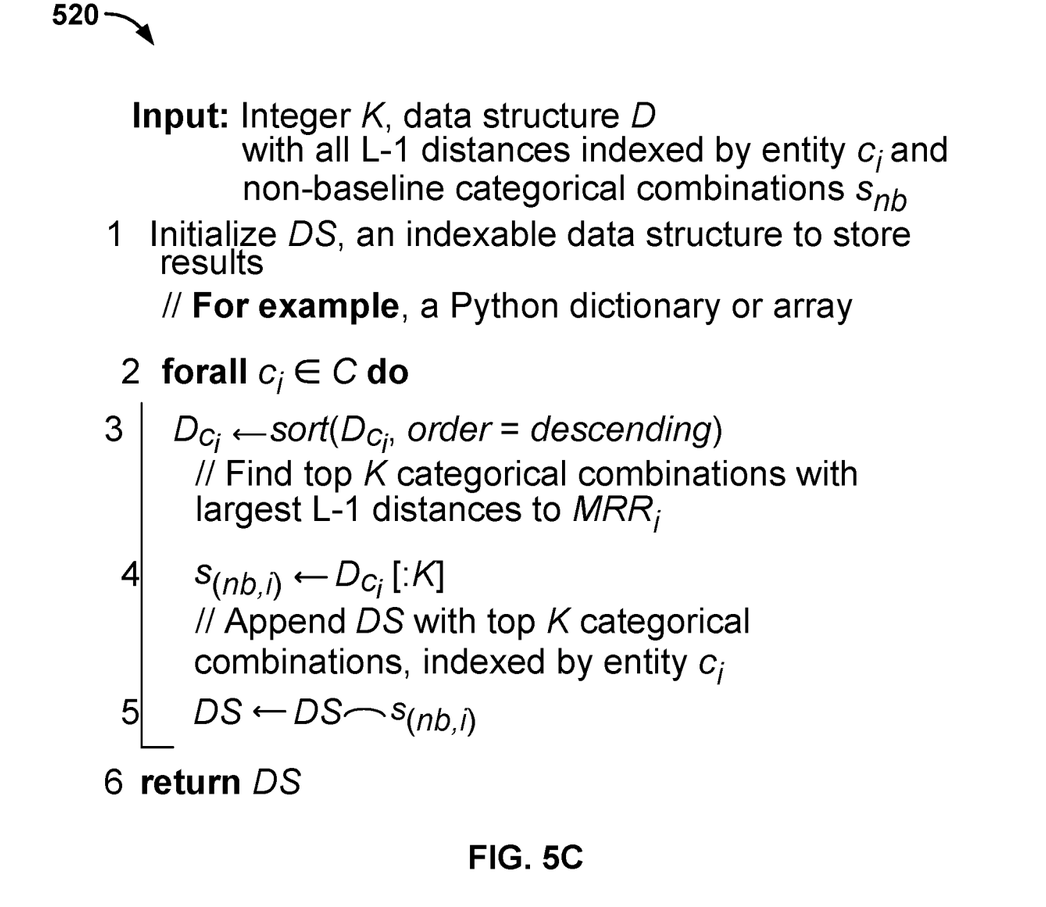
FIG. 5C shows an embodiment of pseudo code 520 for ranking and identifying anomalous log component data categorical value combinations.

FIG. 5C shows an embodiment of pseudo code 520 for ranking and identifying anomalous log data component categorical value combinations. The input to the algorithm of pseudo code 520 is output from pseudo code 510 of FIG. 5B.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
  processing computer log entries to determine a plurality of baseline rank values associated with a ranking dimension, wherein a ranking dimension identifies a specific log data component category, and wherein determining the plurality of baseline rank values comprises determining a count number of log entries for each unique value of the ranking dimension in the computer log entries and sorting the count numbers to rank each unique value of the ranking dimension by its count number;
  using a processor to compute an overall baseline rank indicator using the determined baseline rank values;
  determining for each log data component value combination included in a group of log data component value combinations, a comparison rank value associated with the ranking dimension;
  comparing each of the comparison rank values with the overall baseline rank indicator; and
  based at least in part on the comparisons, identifying one or more log data component value combinations included in the group of log data component value combinations as more anomalous than other log data component value combinations included in the group of log data component value combinations.

2. The method of claim 1, further comprising using the identification of the one or more log data component value combinations as more anomalous to detect a computer network security threat.

3. The method of claim 1, further comprising determining baseline log data component value combinations including by identifying a select number of top ranked values from each of a plurality of component data categories of the computer log entries and generating permutation combinations of each of the top ranked values across the plurality of component data categories of the computer log entries.

4. The method of claim 1, wherein determining the plurality of baseline rank values includes determining a baseline rank value for each of a plurality of different component data categories of the computer log entries.

5. The method of claim 1, wherein the plurality of baseline rank values includes reciprocal rank values.

6. The method of claim 1, wherein the plurality of baseline rank values is determined using a specified ranking metric based on number counts of total numbers of associated matching log entries.

7. The method of claim 1, wherein the baseline rank values and the comparison rank values are based on corresponding log entry count numbers ranked in descending order.

8. The method of claim 1, wherein each baseline rank value of the plurality of baseline rank values corresponds to a different baseline categorical value combination specified by a user.

9. The method of claim 1, wherein computing the overall baseline rank indicator includes calculating a mean reciprocal rank value of the baseline rank values.

10. The method of claim 1, wherein computing the overall baseline rank indicator includes calculating a weighted mean reciprocal rank value of the baseline rank values.

11. The method of claim 1, wherein the computer log entries processed to determine the baseline rank values are different from a second group of log entries utilized in determining the comparison rank values.

12. The method of claim 1, wherein the group of log data component value combinations includes log data component categorical value combinations that have been identified as being not included in a group of baseline log data component categorical value combinations.

13. The method of claim 1, wherein comparing each of the comparison rank values with the overall baseline rank indicator includes determining difference values between each of the comparison rank values with the overall baseline rank indicator.

14. The method of claim 13, wherein identifying the one or more log data component value combinations included in the group of log data component value combinations as more anomalous than the other log data component value combinations included in the group of log data component value combinations includes sorting the difference values and determining that the identified one or more log data component value combinations are associated with larger difference values than the other log data component value combinations included in the group of log data component value combinations.

15. The method of claim 1, further comprising finding one or more of the log entries that correspond to the one or more log data component value combinations identified as more anomalous.

16. The method of claim 1, wherein the computer log entries include computer network access log entries.

17. The method of claim 1, wherein the computer log entries are obtained from edge servers of a content delivery network.

18. The method of claim 1, further comprising processing the computer log entries to identify each unique value of each of one or more data categories of the computer log entries.

19. A system, comprising:
a storage configured to store a repository of computer log entries; and
a processor configured to:
process the computer log entries to determine a plurality of baseline rank values associated with a ranking dimension, wherein a ranking dimension identifies a specific log data component category, and wherein determining the plurality of baseline rank values comprises determining a count number of log entries for each unique value of the ranking dimension in the computer log entries and sorting the count numbers to rank each unique value of the ranking dimension by its count number;
compute an overall baseline rank indicator using the determined baseline rank values;
determine for each log data component value combination included in a group of log data component value combinations, a comparison rank value associated with the ranking dimension;
compare each of the comparison rank values with the overall baseline rank indicator; and
based at least in part on the comparisons, identify one or more log data component value combinations included in the group of log data component value combinations as more anomalous than other log data component value combinations included in the group of log data component value combinations.

20. A computer program product, the computer program product being embodied in a non-transitory computer-readable storage medium and comprising computer instructions for:
processing computer log entries to determine a plurality of baseline rank values associated with a ranking dimension, wherein a ranking dimension identifies a specific log data component category, and wherein determining the plurality of baseline rank values comprises determining a count number of log entries for each unique value of the ranking dimension in the computer log entries and sorting the count numbers to rank each unique value of the ranking dimension by its count number;
computing an overall baseline rank indicator using the determined baseline rank values;
determining for each log data component value combination included in a group of log data component value combinations, a comparison rank value associated with the ranking dimension;
comparing each of the comparison rank values with the overall baseline rank indicator; and
based at least in part on the comparisons, identifying one or more log data component value combinations included in the group of log data component value combinations as more anomalous than other log data component value combinations included in the group of log data component value combinations.

* * * * *